(12) United States Patent
Borghese et al.

(10) Patent No.: US 12,051,965 B2
(45) Date of Patent: *Jul. 30, 2024

(54) DRIVER CIRCUIT FOR SWITCHING CONVERTERS, CORRESPONDING CONVERTER AND METHOD

(71) Applicant: STMicroelectronics S.r.l., Agrate Brianza (IT)

(72) Inventors: Marco Borghese, Milan (IT); Simone Bellisai, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 120 days.

This patent is subject to a terminal disclaimer.

(21) Appl. No.: 17/887,181

(22) Filed: Aug. 12, 2022

(65) Prior Publication Data
US 2022/0385166 A1 Dec. 1, 2022

Related U.S. Application Data

(63) Continuation of application No. 16/583,901, filed on Sep. 26, 2019, now Pat. No. 11,451,127.

(30) Foreign Application Priority Data

Oct. 10, 2018 (IT) .................. 102018000009321

(51) Int. Cl.
*H02M 3/157* (2006.01)
*H02M 1/00* (2006.01)
(Continued)

(52) U.S. Cl.
CPC ........... *H02M 1/08* (2013.01); *H02M 1/0032* (2021.05); *H02M 3/157* (2013.01); *H02M 3/158* (2013.01)

(58) Field of Classification Search
CPC ...... H02M 1/08; H02M 3/158; H02M 1/0032; H02M 3/157
(Continued)

(56) References Cited

U.S. PATENT DOCUMENTS 10,027,219 B1 * 7/2018 Ye .................. H02M 3/156
10,063,143 B1   8/2018 Fan et al.
(Continued)

FOREIGN PATENT DOCUMENTS

WO   2007035392 A2   3/2007

*Primary Examiner* — Harry R Behm
(74) *Attorney, Agent, or Firm* — Slater Matsil, LLP (57) ABSTRACT

A driver circuit includes an input node to receive an input signal for conversion at the output node of a converter, a driver node to provide to a switching power circuit stage in the converter a pulse-width modulated drive signal having an active time, first and second active time generation paths, and a selector circuit coupled to the first and second active time generation paths. The circuit is operable selectively in a first and a second operational mode wherein the driver node receives the pulse-width modulated drive signal having a first active time value generated in the first active time generation path, or a second active time value generated in the second active time generation path. The second active time generation path includes an active time generator network to provide a second active time value with the second active time value adaptively variable to match the first active time value.

20 Claims, 7 Drawing Sheets

(51) Int. Cl.
*H02M 1/08* (2006.01)
*H02M 3/158* (2006.01)

(58) Field of Classification Search
USPC .......................................... 323/271
See application file for complete search history.

(56) References Cited

U.S. PATENT DOCUMENTS

| | | |
|---|---|---|
| 2012/0153919 A1* | 6/2012 | Garbossa .............. H02M 3/156 323/284 |
| 2015/0137776 A1 | 5/2015 | Thomas et al. |
| 2015/0194880 A1* | 7/2015 | Wibben ................ H02M 3/156 323/282 |
| 2015/0207343 A1 | 7/2015 | Zhai |
| 2016/0118881 A1* | 4/2016 | Schmitz ................ H02M 3/157 323/271 |
| 2016/0190920 A1 | 6/2016 | Halberstadt |
| 2018/0375435 A1 | 12/2018 | Muhoberac et al. |

* cited by examiner

DRIVER CIRCUIT FOR SWITCHING CONVERTERS, CORRESPONDING CONVERTER AND METHOD

CROSS-REFERENCE TO RELATED APPLICATIONS

This application is a continuation of U.S. patent application Ser. No. 16/583,901, entitled "DRIVER CIRCUIT FOR SWITCHING CONVERTERS, CORRESPONDING CONVERTER AND METHOD," and filed on Sep. 26, 2019, which priority to Italian Patent Application No. 102018000009321, filed on Oct. 10, 2018, which applications are hereby incorporated herein by reference.

TECHNICAL FIELD

The description relates to switching converters.

One or more embodiments may be applied to systems with low energy consumption, a factor of strong topicality in the current electronics market.

BACKGROUND

Converters such as DC-DC converters comprising a Pulse Skipping Modulator (PSM) facilitate reducing switching losses at low (light) loads while being able to preserve the overall efficiency of the converter and maintain the synchronicity with a clock reference. On the other hand, pulse skipping operation may result in output voltage ripple related primarily to external components, supply voltage and losses, thus being difficult to control.

SUMMARY

Despite the extensive activity in the area, further improved solutions are desirable.

For instance, solutions are desirable which may be capable of optimizing output voltage ripple, and which may exhibit adequate immunity to noise, stability over a wide range of system variables and, possibly, a low impact on static consumption.

An object of one or more embodiments is to contribute in providing such an improved solution.

According to one or more embodiments, such an object can be achieved by means of a circuit having the features set forth in the claims that follow.

One or more embodiments may relate to a corresponding converter.

One or more embodiments may relate to a corresponding method.

The claims are an integral part of the technical teaching provided herein in respect of the embodiments.

One or more embodiments may provide an "event driven" solution having one or more of the following advantages:
- virtually no static current consumption, which facilitates increasing efficiency at low loads;
- the duration of $T_{ON}$ (that is, the active time and thus the duty-cycle) of the pulse-width modulated signal can be modulated as a function of system losses, which facilitates cancelling inaccuracies in the control loop and making state passages between low-power and high-power smoother;
- reduced impact in terms of silicon area occupancy, with cost savings; suitability for use in both synchronous and asynchronous systems, with improved adaptability to a wide range of applications;
- high (notionally complete) immunity to noise achieved via a digital approach, which is a factor of primary importance for a wide range of products and applications.

One or more embodiments may be applied, for instance, in devices including one or more step-down DC-DC converters, leading to a desired behavior of the output voltage or at the switching node of the regulator and its coils current.

One or more embodiments may include digital circuits able to modulate the $T_{ON}$ intended for the power section.

For instance, one or more embodiments may be able to adapt the conduction time with a certain granularity (for instance, with a digital approach) in response to variations in the voltage supply and/or load current, with duration maintained essentially equal to the switching period which is observed in a high-power consumption mode.

BRIEF DESCRIPTION OF THE DRAWINGS

One or more embodiments will now be described, by way of example only, with reference to the annexed figures, wherein.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

Figure 1:
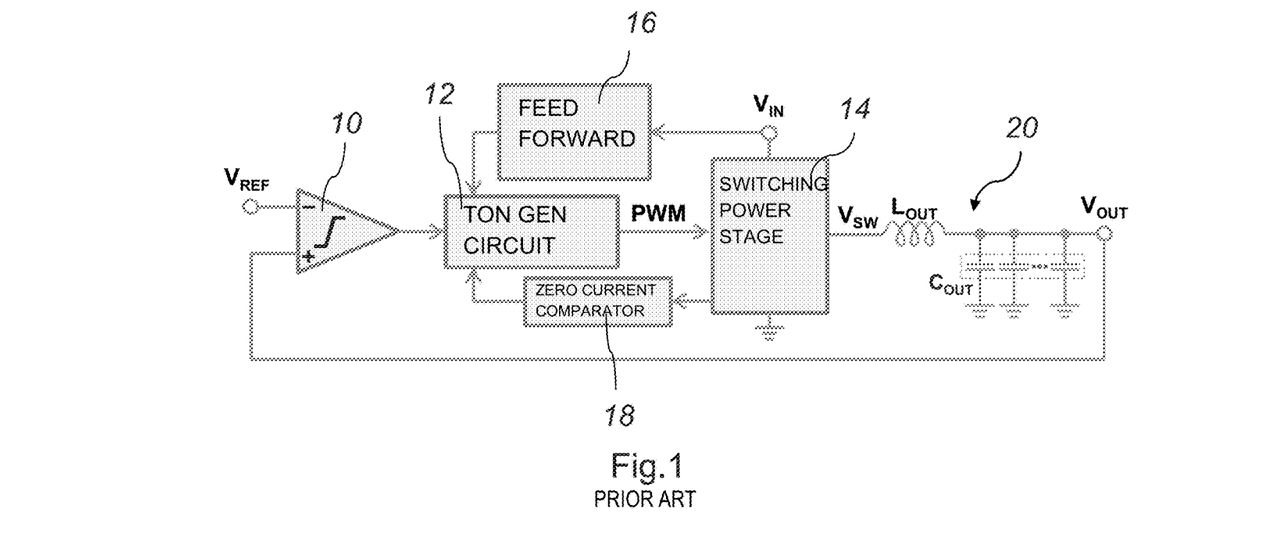
FIG. 1 is a block diagram of a pulse width modulation (PWM) control loop in a converter.

The block diagram of FIG. 1 is exemplary of a conventional DC-DC step-down converter including the following elements:

10: a loop comparator wherein an output voltage $V_{OUT}$ from the converter is compared with a reference voltage $V_{REF}$;

12: a $T_{ON}$ generation circuit sensitive to the output from the loop comparator 10 and configured to provide a pulse-width modulated signal PWM with an active time $T_{ON}$, a non-active time $T_{OFF}$ and a duty cycle $T_{ON}/(T_{ON}+T_{OFF})$;

14: a switching power stage (for instance a power MOSFET stage) driven by the signal PWM from the $T_{ON}$ generation circuit 12 and supplied by an input (voltage) $V_{IN}$;

16: a $V_{IN}$ feed forward stage which applies the input signal $V_{IN}$ the $T_{ON}$ generation circuit 12;

18: a zero current (ZC) comparator active between the power stage 14 and the $T_{ON}$ generation circuit 12; and 20: a low-pass output filter network, for instance a LC low-pass filter including inductive and capacitive components $L_{OUT}$ and $C_{OUT}$, which provides the output (voltage) signal $V_{OUT}$ from the switching output $V_{SW}$ of the power stage 14.

As noted, an arrangement as exemplified in FIG. 1 is conventional in the art, which makes it unnecessary to provide a more detailed description herein.

In an arrangement as exemplified in FIG. 1, the pulse-width modulated signal PWM generated at 12 (and primarily the active time or On-time $T_{ON}$ thereof) is triggered via a feedback loop through the comparator 10 as soon as the difference $V_{OUT}-V_{REF}$ is equal to zero and is a function of the input signal $V_{IN}$ and your itself.

The arrangement of FIG. 1 is exemplary of a solution where, in order to save power dissipation at (ultra)low loads, an integrator along the control loop from the output your is replaced by a simple loop comparator (that is the comparator 10) which determines the need for charge to be possibly supplied on the output.

An arrangement as exemplified in FIG. 1 does not include (active) circuitry able to finely modulate the duration of the "on" time $T_{ON}$ in the signal PWM. This is thus generally forced in open loop (via 16) with possible inaccuracies resulting in terms of output voltage ripple, current ripple in the coil ($L_{OUT}$), with the state passages (high-power/low-power) in the switching power stage 14 far from being smooth.

Heavy trimmings may be adopted in the $T_{ON}$ generation circuits (in both 12 and 16) with the aim to mitigate the intrinsic inaccuracy related to low-power operation in the absence of an integrator along the control loop. This may in turn involve a notable waste in silicon area occupied.

Also, in those applications where appreciable variations in the supply voltage may be expected, a feed-forward loop may be included in order to track these variations in support of the $T_{ON}$ generation circuits. This inevitably (further) weighs down the budget in terms of dissipated power and area occupancy on silicon.

An arrangement which facilitates making state passages smooth, with the ability of modulating the conduction time of a buck converter also in a low-power mode and reducing the output ripple is disclosed in US 2015/0137776 A1.

While satisfactory under various aspects, it is noted that such an arrangement may:

involve an error with a dedicated compensation circuit along the loop;

exhibit current consumption which makes it hardly suitable for certain low-power applications, such as applications involving a "deep sleep mode" for client SSD devices. Client solid state drive (c-SSD) is a designation oftentimes adopted to distinguish between solid state drives for the consumer market and solid state drives for the professional market;

have a high area occupancy with a negative impact on cost;

be suited to operate only within a pulse skip modulator (PSM), where a reference clock is present to dictate the switching times, which is hardly compatible with a pulse frequency modulation (PFM) approach, exhibit noise sensitivity due to the (totally) analog approach.

For instance, when the load current falls to values of the order of a mA (1 milliampere=$10^{-3}$ A) or of the hundreds of μA (1 microampere=$10^{-6}$ A), a few μA of static current can have a significant impact on the overall system efficiency of, for instance, a so-called Buck regulator in PSM mode.

More to the point, it is noted that:

in a high consumption mode, the presence of an integrator may facilitate cancellation of the inaccuracies present in the system;

in a low consumption mode, if an open loop approach is chosen in generating $T_{ON}$, these inaccuracies directly affect the output voltage and more deeply its ripple.

The state passage between the two modes (high consumption/power and low consumption/power) may a critical aspect for the application.

Figure 2:
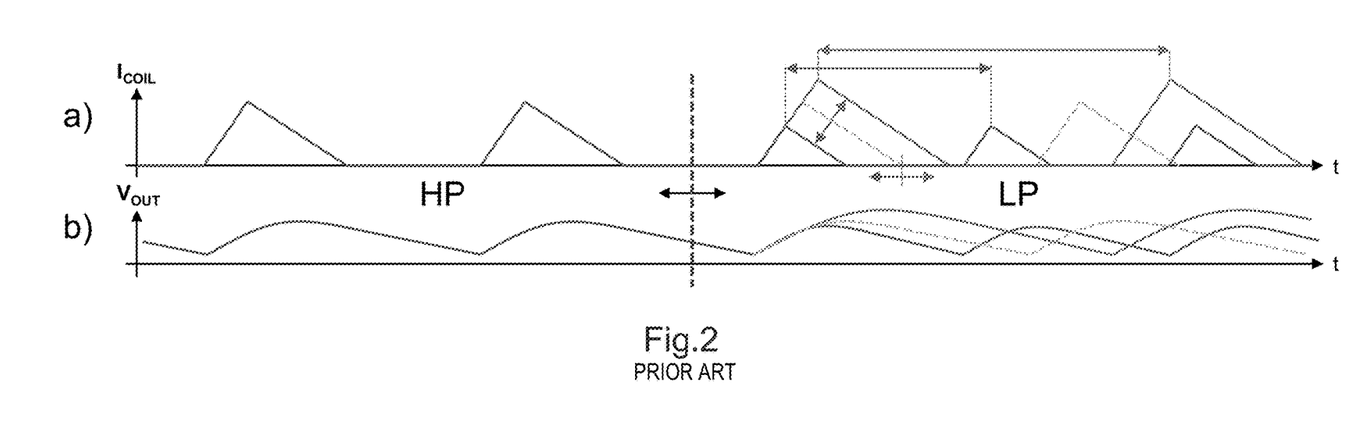
FIG. 2 includes two diagrams indicated a) and b), respectively, exemplary of moving from high-power to low-power operation mode in an arrangement as shown in FIG. 1 in the absence of an integrator.

For instance, FIG. 2 is schematically exemplary of a possible behavior of the current Icon, though $L_{OUT}$—upper diagram of portion a)—through $L_{OUT}$ and the voltage $V_{OUT}$—lower diagram of portion b)—when transitioning between high-power operation (HP, left-hand side) and low-power operation (LP, right-hand side).

One or more embodiments may address the issues discussed previously by resorting to an "event driven" digital approach in generating the On-time (active time $T_{ON}$ of the pulse-width modulated signal PWM), for instance in low-power conditions.

Such an event-driven solution is found to exhibit notionally zero static consumption due to consumption confined to a commanded On-time action performed.

One or more embodiments may involve a ring oscillator and a counter which facilitate modulating the On-time duration.

A corresponding step size can be selected small enough—for instance, 0.7 ns (1 ns=$10^{-9}$ s)—to avoid steady-state subharmonics, with a corresponding digital word (for instance 12 bits) used to determine the On-time duration which is compatible with system requirements.

Figure 3:
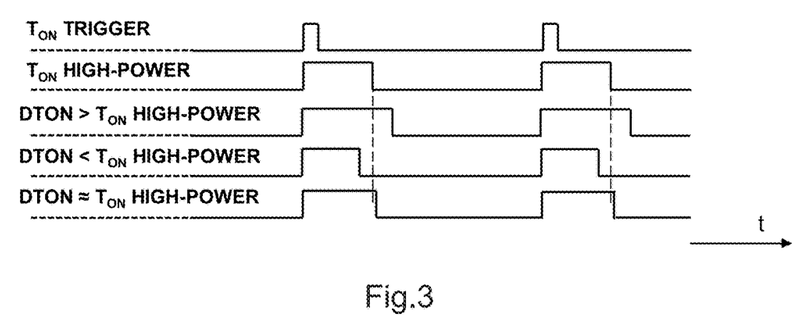
FIG. 3 is a diagram showing certain signal behavior useful in understanding embodiments.

FIG. 3 is exemplary of such an approach and shows (with respect to a common time scale t) possible options in generating such a signal DTON related to $T_{ON}$ TRIGGER and $T_{ON}$ HIGH-POWER pulses.

As exemplified in FIG. 3, with a converter (regulator) in a high-power mode, the digital signal DTON can be increased (if the pulse on signal DTON is detected to be shorter than $T_{ON}$ HIGH-POWER), decreased (if the pulse on signal DTON is detected to be greater than $T_{ON}$ HIGH-POWER) or maintained unaltered (if the pulse on signal DTON has the same duration of those on signal $T_{ON}$ HIGH-POWER) at each conduction time by comparing the effective On-time at the power stage 14 (generally dictated by an integrator along the control loop) with a value for $T_{ON}$ generated digitally by the circuit. This facilitates causing the first $T_{ON}$ performed when transitioning to low-power mode to have complete consistency and continuity with the last one performed in the (preceding) high-power mode, so that the transitions between the states (high-power to low-power) may be smooth and exempt from ripple jumps.

With the converter is a low-power mode, the digital word which dictates the duration of the pulse on signal DTON can be modulated in order to produce current pulses lying exactly an ideal high-power switching period ($T_{SW}$).

Thus:
if a zero current (ZC) event (in the power stage 14) during the Off-time (or $T_{OFF}$) is detected too late or too early, the following digital On-time will be reduced or increased by a single step,
if the zero current rising edge occurs at the end of the ideal $T_{SW}$, the following digital On-time and the associated digital word remain unchanged.

As an example, in the presence of a reduction in supply (for instance, a drop in the input voltage $V_{IN}$) the system reacts by increasing the On-time by a single step at each pulse in order to restore the condition where the conduction time is ideally equal to a single $T_{SW}$.

The information used to discriminate whether updating the digital word is desirable or not may be provided by the position of a zero current event (ZC) in the ideal high-power $T_{SW}$: more to the point, a corresponding routine can be devised which stops as a result of such an event triggered in the last portion of the period (hence the desirability of a high frequency clock—12 MHz, for instance—capable of finely partitioning the associated time window).

Figure 4:
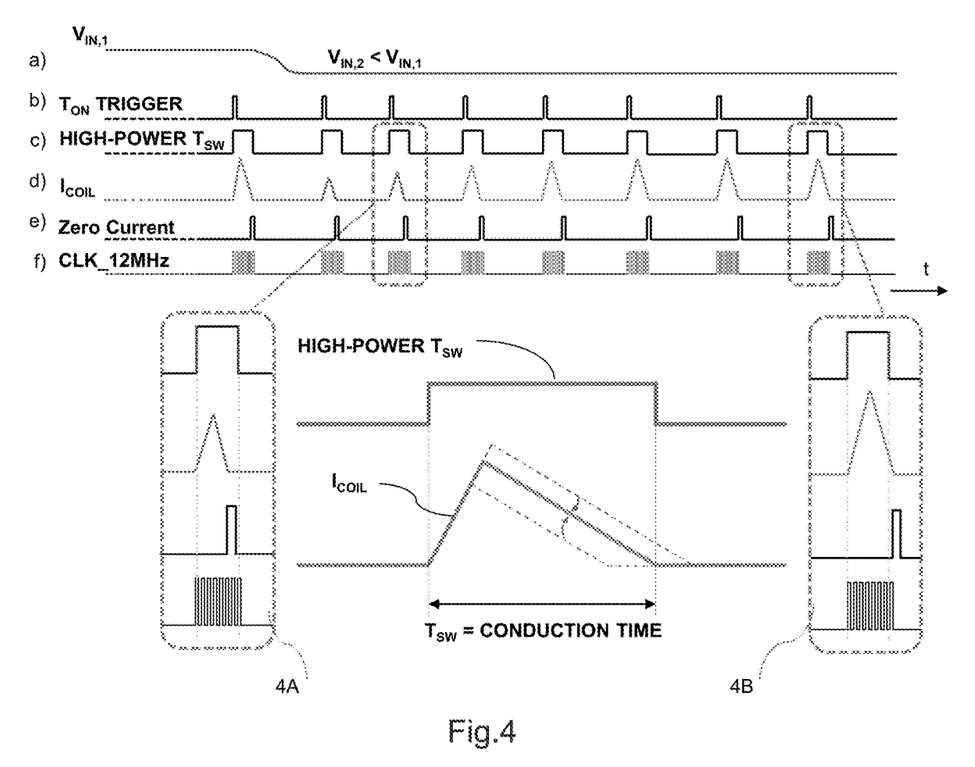
FIG. 4 includes six diagrams indicated a) to f), respectively, exemplary of operation of embodiments.

A corresponding example is depicted in FIG. 4, where the uppermost diagram—labeled a)—is exemplary of a decrease of the input voltage $V_{IN}$ to the converter from $V_{IN,1}$ to $V_{IN,2}$ with $V_{IN,2} < V_{IN,1}$.

The diagrams labeled b) to f) show—against a common time scale t—possible behaviors of certain signals coming along with the decrease of the input voltage $V_{IN}$ from $V_{IN,1}$ to $V_{IN,2}$:

b) $T_{ON}$ TRIGGER
c) HIGH-POWER $T_{SW}$
d) the current $I_{COIL}$ in the coil $L_{OUT}$
e) the output of the zero current detector (Zero Current)
f) a corresponding clock signal CLK (for instance at 12 MHz).

The portions of the diagrams c) to f) reproduced on an enlarged scale in the dashed line frames indicated as 4A and 4B highlight the behavior of the routine just described in keeping the coil current $I_{COIL}$ (which may have the sawtooth-like behavior exemplified between 4A and 4B) within a desired time frame as exemplified by HIGH-POWER $T_{SW}$ irrespective of the reduction of the input voltage $V_{IN}$ from $V_{IN,1}$ to $V_{IN,2}$.

One or more embodiments may thus be regarded as exemplary of solutions that implements a sort of slow supply feed-forward (at no cost in terms of dissipated power).

Figure 5:
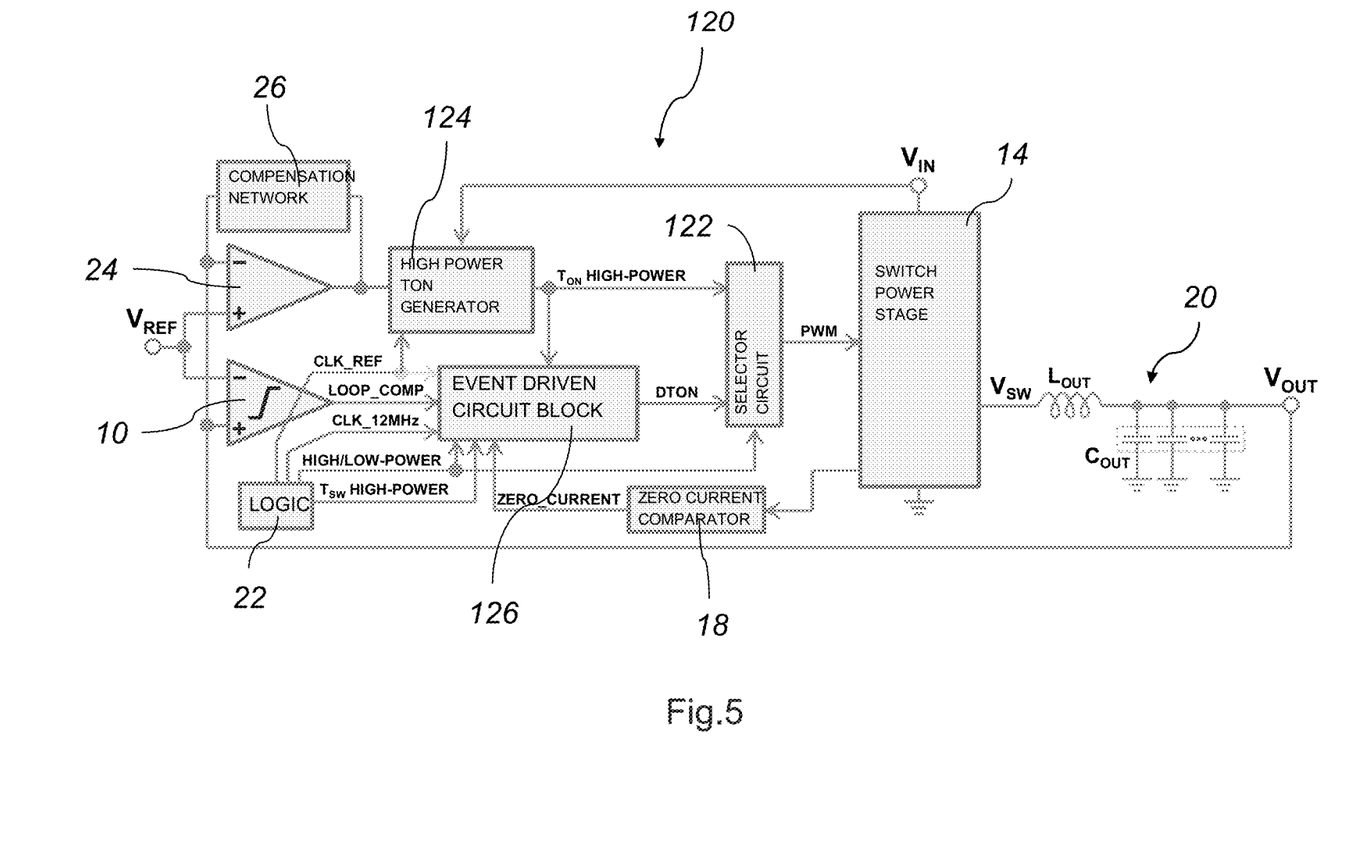
FIGS. 5 and 6 are block and circuit diagrams exemplary of embodiments.

FIG. 5 is a block diagram exemplary of embodiments.

For brevity and simplicity, parts or elements like part or elements already discussed in connection with FIG. 1 are indicated in FIG. 5 with like reference symbols, thus making it unnecessary to repeat a detailed description.

Briefly, the block diagram of FIG. 5 can be regarded as exemplary of a converter circuit as introduced in FIG. 1 wherein the $T_{ON}$ generation circuit block 12 (and the $V_{IN}$ feed forward circuit block 16) are replaced with circuitry designated 120 as a whole.

Circuitry 120 as discussed in the following may be configured to generate the pulse-width modulated signal PWM fed to the power circuits stage 14 according to the principles introduced in the foregoing in connection with FIGS. 3 and 4.

The circuitry in the block diagram of FIG. 5 can be regarded as including a high-power loop and a low-power loop intended to provide respective values for the "on" signal $T_{ON}$, namely $T_{ON}$ HIGH-POWER and DTON, to a selector circuit 122. The circuit 122 may thus forward to the power circuit stage 14 (as a PWM drive signals therefor) either one of $T_{ON}$ HIGH-POWER or DTON as a function of a state signal HIGH/LOW-POWER supplied to the selector circuit 122 by a (main) logic circuit 22.

In one or more embodiments, the logic circuit 22 (a microcontroller, for instance) may be configured—in a manner known to those of skill in the art—to provide:
a first (reference) clock signal CLK_REF to a high-power $T_{ON}$ generator 124 in the high-power loop which is sensitive to the input voltage $V_{IN}$ and provides to the selector circuit 122 the $T_{ON}$ HIGH-POWER signal;
a second (for instance 12 MHz) clock signal CLK_12 MHZ and an (ideal) $T_{SW}$ signal to an "event driven" circuit block 126 in the low-power loop which is configured to provide to the selector circuit 122 the DTON signal as further discussed in the following;
the HIGH/LOW-POWER signal indicative of the converter circuit being in a high-power or low-power operational state with this signal supplied also to the event driven circuit block 126 in addition to the selector circuit 122.

As exemplified in FIG. 5, the event driven circuit block 126 is also sensitive to:
a loop compensation signal LOOP_COMP from the loop comparator 10 where the output voltage $V_{OUT}$ is compared with the reference voltage $V_{REF}$;
the output ZERO_CURRENT from the zero current comparator 18;
the $T_{ON}$ HIGH-POWER signal from the high-power $T_{ON}$ generator 124 (which may result in the circuit block 126 being sensitive to the reference clock signal CLK_REF).

In a circuit as exemplified in FIG. 5 the high-power $T_{ON}$ generator 124 in the high-power loop may also be sensitive to the output signal from a differential circuit 24 in a (negative) feedback configuration, wherein the differential circuit 24 receives at the non-inverting input the reference voltage $V_{REF}$ and is coupled at the inverting input to a compensation network 26 sensitive to the input to the high-power $T_{ON}$ generator 124.

The blocks 24 and 26 facilitate increasing the DC gain of the high-power loop compensating the inaccuracies and guaranteeing at the same time the stability as soon as $L_{OUT}$ and $C_{OUT}$ vary.

Figure 6:
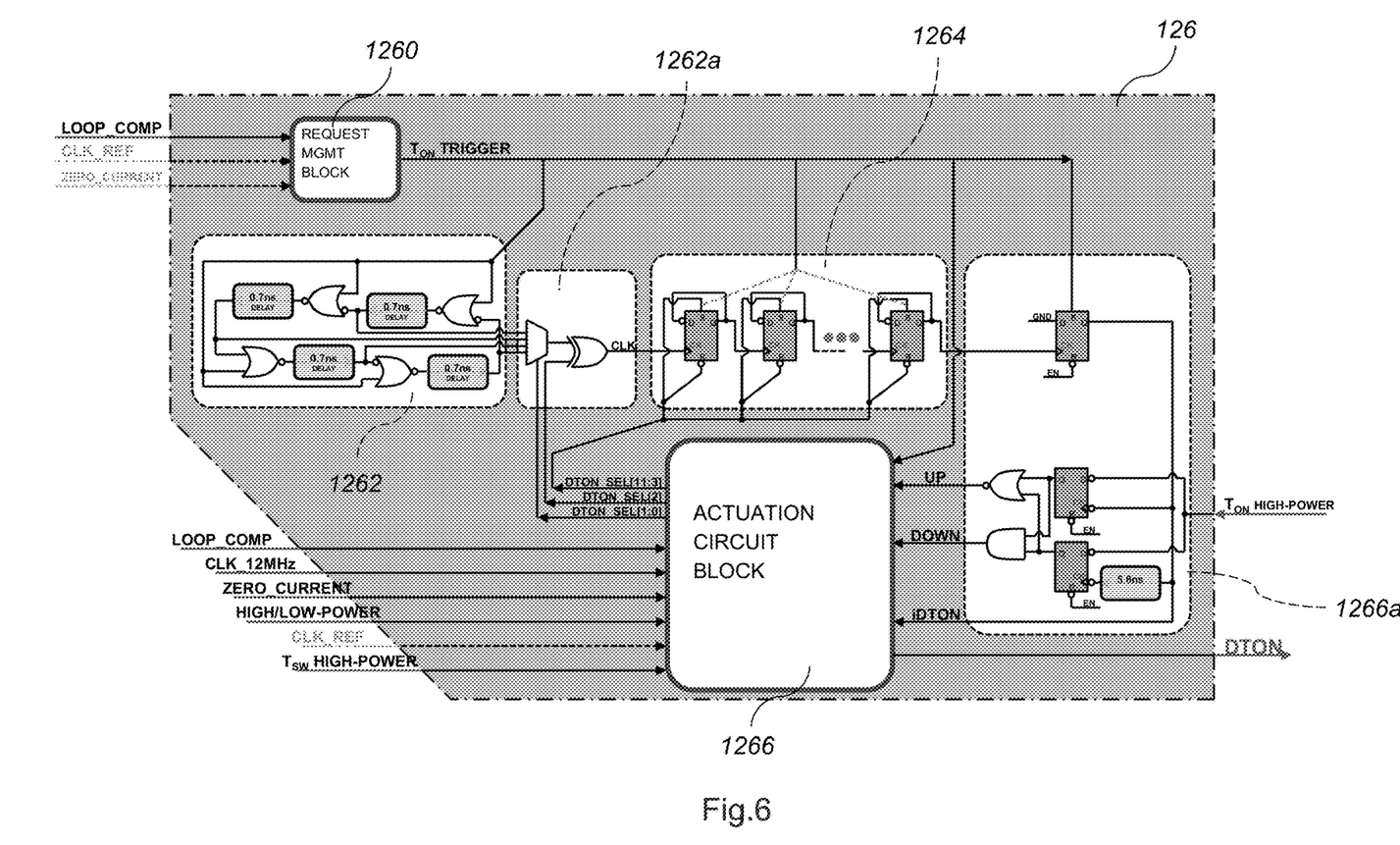

The circuit diagram of FIG. 6 is a low-level representation of a possible implementation of the circuit block 126 intended to generate the signal DTON, with the same signal designations already introduced in the foregoing reproduced for simplicity.

It will be otherwise appreciated that both FIGS. 5 and 6 contemplate the possible presence of a reference clock, namely CLK_REF. This may be used also in the low-power mode, as an input for the circuit block 126 (for instance via the circuit block 124).

In fact, in addition to a purely asynchronous low-power control, one or more embodiments may be suited for use also in a (totally) synchronous system.

Both these options will be discussed in the following.

In the circuit diagram of FIG. 6, reference 1260 denotes a $T_{ON}$ request management block sensitive to the signal LOOP_COMP and configured to be activated (only) in the low-power mode with the role of transforming $T_{ON}$ requests from the loop comparator 10 into small 0→1→0 pulses in order to start an internal oscillator 1262. A ring oscillator as discussed in connection with FIG. 7 may be exemplary of such an oscillator.

Depending on the type of the control loop (for instance: asynchronous or synchronous, continuous-conduction mode—CCM allowed in addition to discontinuous-conduction mode DCM, . . . ) the sub-block 1260 may also be made sensitive to the ZERO_CURRENT and CLK_REF signals.

For instance, in the case of a synchronous system forced to operate in discontinuous-conduction mode (DCM) during low-power mode operation, all the three signals LOOP_COMP, ZERO_CURRENT and CLK_REF may be used to start an On-time. Conversely, in an asynchronous system free to evolve in Continuous-Conduction Mode (CCM) just the LOOP_COMP signal may be used to start a charging phase.

Once a $T_{ON}$ trigger pulse has been produced the oscillator 1262 and an associated counter 1264 cascaded thereto exit their reset condition and an internal DTON signal, designated iDTON in FIG. 6, is set to be input to a digital $T_{ON}$ word update and actuation circuit block 1266.

In one or more embodiments as exemplified in FIG. 6, the oscillator 1262 may have an intrinsic clock period equal to, for instance, (0.7 ns×4×2)=5.6 ns (1 ns=1·10$^{-9}$ s): this is of course a merely exemplary value.

In one or more embodiments, a clock pre-selector circuit block 1262a may be provided at the output of the oscillator 1262.

Figure 7:
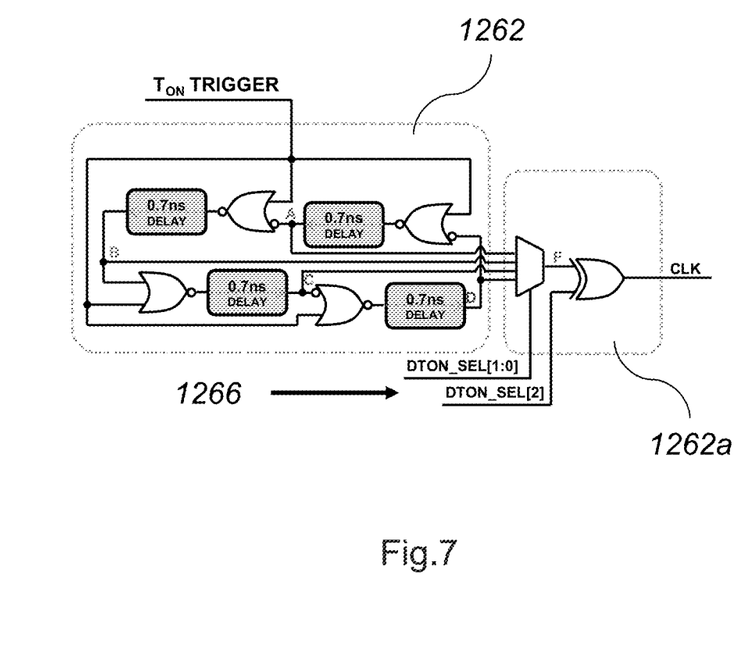
FIG. 7 is a circuit diagram of a possible implementation detail of embodiments.
Figure 8:
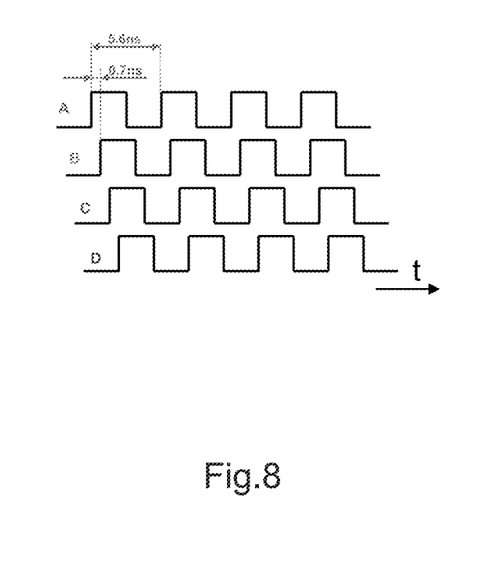
FIG. 8 is a set of time diagrams of signal behavior related to FIG. 7.

The pre-selector circuit block 1262a may be configured to use, for instance, 3 of the 12 bits of the $T_{ON}$ digital word (that is a time resolution equal to 0.7 ns as shown in FIG. 7). This approach facilitates finely modulating the digital $T_{ON}$ duration saving area and energy.

In an embodiment as exemplified in FIG. 7 (right hand side) the clock pre-selector circuit block 1262a may include a multiplexer coupled to the oscillator ring and controlled by a first selection signal DTON_SEL[1:0] as well as an EX-OR gate having inputs coupled to the output from the multiplexer and to a second selection signal DTON_SEL[2] as well as providing a (selected) clock signal CLK to the counter 1264.

The selection signals DTON_SEL[1:0] and DTON_SEL[2] can be provided (in a manner known per se) by the actuation logic 1266 which may also provide a corresponding signal DTON_SEL[11:3] to the counter 1264.

In one or more embodiments the counter 1264 following the pre-selector circuit block 1262a may be a 9-bit counter, which reaches its overflow more or less later depending on the $T_{ON}$ digital word status.

The overflow condition of the counter 1264 determines the falling edge of iDTON signal and the (automatic) reset of the state machine embodied in the circuit 126.

When in the low-power mode, the signal iDTON is managed (directly) by the actuation logic 1266 to generate the DTON signal intended to be applied (via the selector 122) to the power stage circuitry 14.

Conversely, in the high-power mode, the high duration of this signal is compared with the value for $T_{ON}$ generated along the control loop (with possible presence of an integrator) with the purpose of aligning the "digital" On-time generated at 126 with the "analog" On-time generated at 124, for instance by increasing or reducing adequately (see also FIG. 3) the digital word in the circuit 126.

Fixing, for instance via a delay network designated 1266a in FIG. 6, a certain delay (5.6 ns, in the instant exemplary case) between an UP signal path and a DOWN signal path for $T_{ON}$ HIGH-POWER to the actuation logic 1266 may facilitate dispensing with steady-state jitter on the $T_{ON}$ digital word.

In embodiments as exemplified herein, in high-power mode operation, the digital $T_{ON}$ duration (DTON from 126) tracks the analog $T_{ON}$ duration ($T_{ON}$ HIGH-POWER from 124) provided by the main control loop.

In embodiments as exemplified herein, in low-power mode operation—in case an asynchronous control is applied—at each $T_{ON}$ trigger pulse, a time window is opened having a duration notionally equal to an "ideal" high-power switching period $T_{SW}$. In addition, also an internal clock (12 MHz in the example considered herein) will be running during the same window to monitor the instant at which a rising edge occurs in the ZERO_CURRENT signal.

In an example as considered herein, three different cases are possible:
 the ZERO_CURRENT rising edge occurs after the $T_{SW}$ mask ending; the $T_{ON}$ digital word is decreased by one step (see also the second time diagram in FIG. 3);
 the ZERO_CURRENT rising edge occurs immediately before the $T_{SW}$ mask ending, during the last 12 MHz clock period included within the $T_{SW}$ mask; the $T_{ON}$ digital word remains unchanged (see also the last time diagram in FIG. 3);
 the ZERO_CURRENT rising edge occurs more than a 12 MHz clock period before the $T_{SW}$ mask ending; the $T_{ON}$ digital word is increased by one step (see also the next-to-last time diagram in FIG. 3).

In embodiments as exemplified herein, in low-power mode operation—in case a synchronous control is applied—the notional value for high-power $T_{SW}$ is simply replaced by the (time) distance between two subsequent rising edges of the reference clock CLK_REF and the digital word update procedure (in low-power mode) will take into account also the condition of the converter (regulator) during the immediately preceding switching period with respect to the one where the zero current position is checked in the signal ZERO_CURRENT.

Considering a "good" pulse for the measurement may be facilitated by referring to On-time pulses triggered with the regulator output in high impedance condition.

For instance, all the pulses but the first one in a train of contiguous pulses can be discarded (it is noted that understanding simply if the pulses fall exactly within a certain switching period may be hardly possible).

Figure 9:
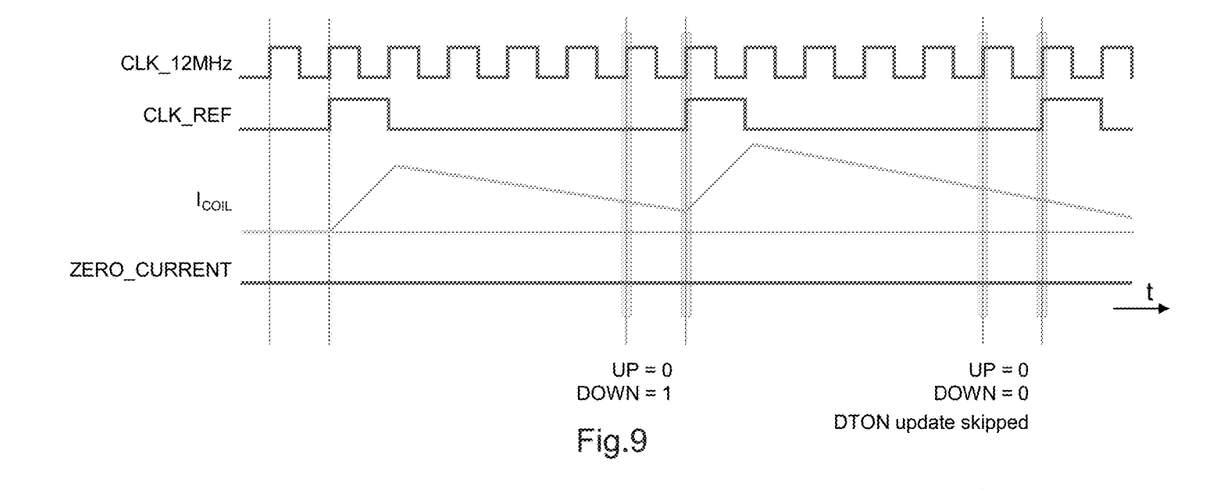
FIGS. 9 and 10 each include four time diagrams, exemplary of possible operation of embodiments.

In that respect, one may refer to the time diagrams a) to d) in FIG. 9 which (as in the case of FIG. 10) show, with reference to a common time scale t, a possible time behavior of the following signals:
 CLK_12 MHz
 CLK_REF
 $I_{COIL}$ (the current in the coil $L_{OUT}$)
 ZERO_CURRENT.

FIG. 9 is exemplary of a case where the first current pulse starts with the regulator (converter) output in high impedance with the second pulse, starting on the trailing edge of the first pulse.

This causes the current to increase starting from a point above zero. At the end of the switching period, the current is well above zero but it is not possible to define if the On-time duration was too high.

For that reason, in one or more embodiments, the second pulse will be discarded from the detection of the $T_{ON}$ duration.

Figure 10:
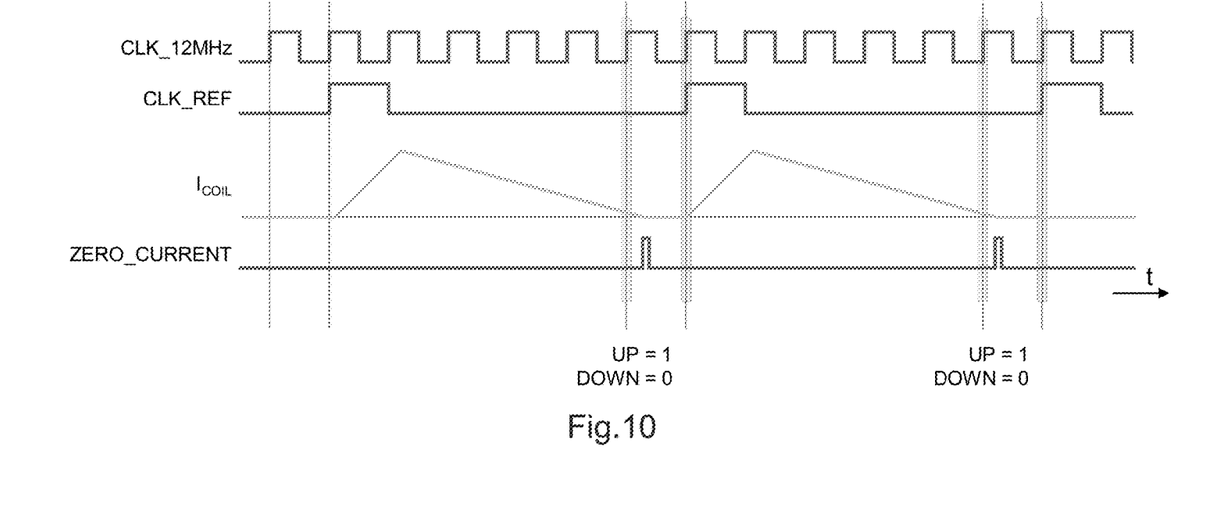

Conversely, FIG. 10 is exemplary of a case where the second pulse starts from a high impedance condition and thus also the second pulse is considered for the On-time duration measurement.

Figure 11:
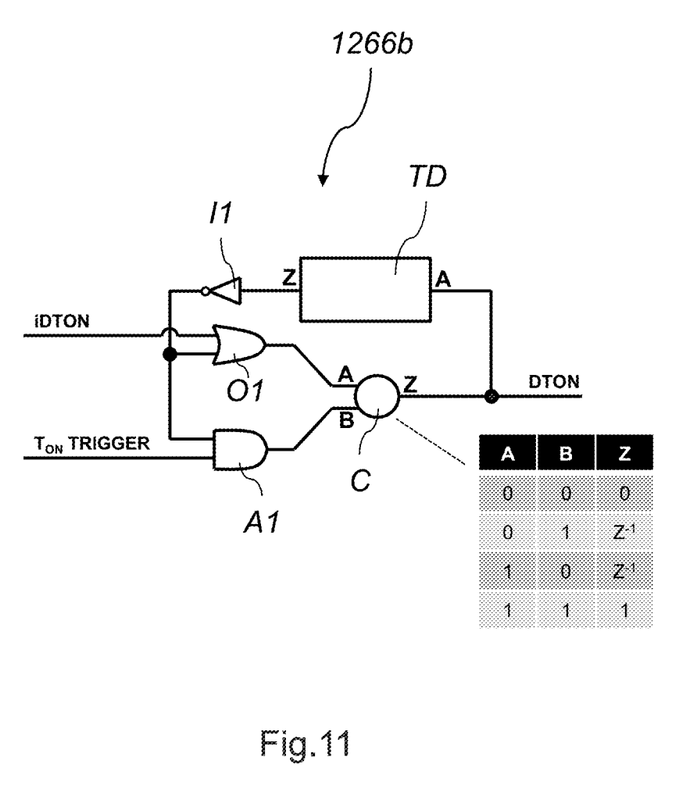
FIG. 11 is a circuit diagram of a possible implementation detail of embodiments.

The circuit diagram of FIG. 11 is exemplary of a possible implementation of a circuit 1266b which may be included in the circuit block 1266 in order to generate the signal DTON starting from the "internal" signal iDTON.

This facilitates complying with minimum On-time and Off-time values as desirable for adequate operation of the power circuit stage 14.

As exemplified in FIG. 11, signal iDTON can be applied to one input of an OR gate O1 whose other input receives the output signal DTON through the cascaded arrangement of a delay element TD (configured to provide and asymmetrical rise/fall minimum $T_{ON}/T_{OFF}$ delay) and an inverter I1. The output from the OR gate O1 is passed to a first input A of a (combinatorial) logic network C whose other input, designated B, is provided by the output for man AND gate A1 which receives as inputs the signal $T_{ON}$ TRIGGER (input to the oscillator 1262 as shown in FIG. 7) and the signal DTON delayed at TD and inverter at I1.

A possible truth table (output Z v. inputs A and B) for the network C may be as follows:

| A | B | Z |
|---|---|---|
| 0 | 0 | 0 |
| 0 | 1 | $Z^{-1}$ |
| 1 | 0 | $Z^{-1}$ |
| 1 | 1 | 1 | where $Z^{-1}$ denotes the previous value assumed by output Z.

Embodiments of an asynchronous DC-DC buck regulator as exemplified herein were found to have a current consumption at 85° C. (static plus dynamic) in the order of 320 nA (1 nA=$10^{-9}$ A) in the following operating scenario:

deep low-power mode ($I_{LOAD}$=1 mA)
$V_{IN}$=3.3V, $V_{OUT}$=1V
high-power $T_{SW}$=2 MHz
external inductor ($L_{OUT}$) 1 µH (1 µH=$10^{-6}$ H), external capacitance ($C_{OUT}$) 44 µF (1 µF=$10^{-6}$ F).

It is noted that consumptions figure indicated is more than one order lower compared to an "aggressive" analog solutions.

Area estimations for a totally synchronous system are in range of 16,900 µm² (1 µm=$10^{-6}$ m).

In one or more embodiments, a circuit may comprise:
an input node configured to receive an input signal (for instance, $V_{IN}$) for conversion in a converter having an output node (for instance, $V_{OUT}$);
a driver node configured to provide to a switching power circuit stage (for instance, 14) in the converter a pulse-width modulated drive signal (PWM) having an active time (for instance, $T_{ON}$),
first (for instance, 124) and second (for instance, 126) active time generation paths,
a selector circuit block (for instance, 122) coupled to the first and second active time generation paths as well as to the driver node, the selector circuit block configured to transfer to the driver node:
i) in a first operational mode of the circuit, a pulse-width modulated drive signal having a first active time value (for instance, $T_{ON}$ HIGH-POWER) generated in the first active time generation path, or
ii) in a second operational mode of the circuit, a pulse-width modulated drive signal having a second active time value (for instance, DTON) generated in the second active time generation path,
wherein:
the first active time generation path comprises an active time generator circuit configured to provide said first active time value,
the second active time generation path comprises an active time generator network configured to provide a digitally-generated second active time value with said second active time value adaptively variable to match said first active time value as a result of the circuit transitioning between the first operational mode and the second operational mode.

In one or more embodiments, the active time generator network in the second active time generation path may be configured to provide step-wise variations of said second active time value, optionally by providing said second active time value as a digital word.

In one or more embodiments, the active time generator network in the second active time generation path may be configured (for instance, 1266) to increase (for instance, if DTON<$T_{ON}$ HIGH-POWER), decrease (for instance, if DTON>$T_{ON}$ HIGH-POWER) or maintain (for instance, DTON=$T_{ON}$ HIGH-POWER) said digitally-generated second active time value as a result of the circuit transitioning from the first operational mode to the second operational mode.

In one or more embodiments, the active time generator network in the second active time generation path may comprise:
a generator circuit stage (for instance, 1260, 1262a, 1264) configured to provide a respective digital value (for instance, iDTON) for said active time (for instance, $T_{ON}$) of the pulse-width modulated drive signal (PWM),
a comparator circuit (for instance, 1266) sensitive (for instance, 18, ZERO_CURRENT) to said respective digital value (iDTON) and a current effective value of said active time at said power circuit stage, the comparator circuit configured to perform a comparison of said respective digital value and said current effective active time value,
wherein the active time generator network in the second active time generation path is configured to increase (for instance, if DTON<$T_{ON}$ HIGH-POWER), decrease (for instance, if DTON>$T_{ON}$ HIGH-POWER) or maintain (for instance, DTON=$T_{ON}$ HIGH-POWER), respectively, said digitally-generated second active time value as a function of the result of the comparison performed in said comparator circuit.

In one or more embodiments, the comparator circuit may be sensitive (for instance, 18, ZERO_CURRENT) to zero current events at said power circuit stage, wherein the active time generator network in the second active time generation path may be configured to:

maintain said digitally-generated second active time value as a result of zero current events occurring at said power circuit stage at controlled switching times (for instance, $T_{SW}$), increase (for instance, if DTON<$T_{ON}$ HIGH-POWER) or decrease (for instance, if DTON>$T_{ON}$ HIGH-POWER) said digitally-generated second active time value as a result of zero current events occurring earlier or later, respectively, than said controlled switching times).

In one or more embodiments, the active time generator network in the second active time generation path may be configured to modulate said digitally-generated second active time value to match a reference switching period as a result of the circuit transitioning from the second operational mode to the first operational mode.

In one or more embodiments, a converter, may comprise:
a circuit according to one or more embodiments comprising said input node configured to receive said input signal (for instance, $V_{IN}$) for conversion in the converter having an output node (for instance, $V_{OUT}$);
a switching power circuit stage (for instance, 14) coupled to the driver node of said circuit to receive therefrom said pulse-width modulated drive signal (PWM) having an active time (for instance, $T_{ON}$),
a converter output network, optionally an LC low-pass network (for instance, $L_{OUT}$, $C_{OUT}$), comprising said output node, the converter output network driven by said power circuit stage.

One or more embodiments may comprise:
a reference node configured to receive a reference signal (for instance, $V_{REF}$),
a feedback line coupled to the output node from the converter to provide a feedback signal indicative of the signal at said output node,
and wherein said first and second active time generation paths may comprise differential input circuitry coupled to said reference node and said feedback line and configured to perform a comparison of said reference signal with said feedback signal and drive said first and second active time generation paths as function of the outcome of said comparison.

One or more embodiments may comprise an operation mode selection logic (for instance, 22), the operation mode selection logic configured to selectively switch operation of the converter between said first operational modes of the circuit and said second operational mode of the circuit.

In one or more embodiments, a method of operating the circuit or the converter of one or more embodiments may comprise selectively switching operation of said circuit between said first operational mode and said second operational mode.

Without prejudice to the underlying principles, the details and embodiments may vary, even significantly, with respect to what has been described by way of example only, without departing from the extent of protection.

The extent of protection is defined by the annexed claims.

What is claimed is:

1. An electronic circuit comprising:
an input node configured to receive an input signal for conversion in a converter having an output node;
a driver node configured to provide to a switching power circuit stage in the converter a driving pulse-width modulated (PWM) signal;
a first active time generator circuit configured to provide a first PWM signal having a first active time value;
a second active time generator circuit configured to provide a second PWM signal having a second active time value; and
a selector circuit configured to:
receive the first and second PWM signals,
in a first operational mode of the electronic circuit, provide the first PWM signal as the driving PWM signal to the switching power circuit stage, and
in a second operational mode of the electronic circuit, provide the second PWM signal as the driving PWM signal to the switching power circuit stage, wherein the second active time generator circuit is configured to adaptively vary, in a step-wise manner, the second PWM signal to cause the second active time value to match the first active time value during a transition between the first and second operational modes.

2. The electronic circuit of claim 1, wherein the second active time generator circuit is configured to adaptively vary the second PWM signal based on the first PWM signal.

3. The electronic circuit of claim 1, wherein the second active time generator circuit is configured to adaptively vary the second PWM signal based on a zero current event in the switching power circuit stage.

4. The electronic circuit of claim 3, wherein the second active time generator circuit is configured to adaptively vary the second PWM signal based on a position of the zero current event with respect to a switching period of the first PWM signal.

5. The electronic circuit of claim 1, wherein the second active time generator circuit comprises a generator circuit stage configured to generate a trigger signal based on a voltage at the output node, and generate a third signal based on the trigger signal and the first PWM signal, wherein the second active time generator circuit is configured to generate the second PWM signal based on the third signal.

6. The electronic circuit of claim 5, wherein the second active time generator circuit further comprises:
a first AND gate having a first input configured to receive the trigger signal;
a first OR gate having a first input configured to receive the third signal;
a logic circuit having a first input coupled to an output of the first AND gate, a second input coupled to an output of the first OR gate, and an output configured to provide the second PWM signal;
a delay circuit having an input coupled to the output of the logic circuit; and
an inverter having an input coupled to an output of the delay circuit, and an output coupled to a second input of the first AND gate and to a second input of the first OR gate, wherein the logic circuit is configured to:
when the output of the first AND gate is equal to the output of the first OR gate, cause the second PWM signal to be equal to the output of the first OR gate, and
when the output of the first AND gate is different from the output of the first OR gate, cause the PWM signal to remain at a previous state.

7. The electronic circuit of claim 5, wherein the generator circuit stage comprises a first flip-flop having a first input configured to receive the trigger signal, a second input configured to receive a clock signal, and an output configured to provide the third signal.

8. The electronic circuit of claim 7, wherein the generator circuit stage further comprises a counter configured to provide the clock signal to the first flip-flop.

9. The electronic circuit of claim 5, wherein the generator circuit stage is configured to generate the trigger signal based on a zero current event in the switching power circuit stage.

10. The electronic circuit of claim 1, wherein the first operational mode is a high power mode and the second operational mode is a low power mode.

11. The electronic circuit of claim 1, wherein the second active time generator circuit is configured to adaptively vary the second PWM signal in response to variations in the input signal.

12. The electronic circuit of claim 1, wherein the second active time generator circuit is configured to adaptively vary the second PWM signal in response to variations in a load current flogging through the output node.

13. The electronic circuit of claim 1, further comprising a switching power circuit stage coupled to the driver node.

14. An electronic circuit comprising:
  a driver node configured to provide to a switching power circuit stage of a converter a driving pulse-width modulated (PWM) signal;
  a first active time generator circuit configured to provide a first PWM signal having a first active time value;
  a second active time generator circuit configured to provide a second PWM signal having a second active time value; and
  a selector circuit configured to:
    receive the first and second PWM signals,
    in a high power operational mode of the electronic circuit, provide the first PWM signal as the driving PWM signal to the switching power circuit stage, and
    in a low power operational mode of the electronic circuit, provide the second PWM signal as the driving PWM signal to the switching power circuit stage, wherein the second active time generator circuit is configured to adaptively vary, in a step-wise manner, the second PWM signal to cause the second active time value to match the first active time value during a transition between the high power operation mode and the low power operational mode.

15. The electronic circuit of claim 14, wherein the second active time generator circuit is configured to adaptively vary the second PWM signal based on a position of a zero current event in the switching power circuit stage with respect to a switching period of the first PWM signal.

16. The electronic circuit of claim 14, wherein the second active time generator circuit comprises:
  a generator circuit stage configured to generate a trigger signal and generate a third signal based on the trigger signal;
  a first AND gate having a first input configured to receive the trigger signal;
  a first OR gate having a first input configured to receive the third signal;
  a logic circuit having a first input coupled to an output of the first AND gate, a second input coupled to an output of the first OR gate, and an output configured to provide the second PWM signal;
  a delay circuit having an input coupled to the output of the logic circuit; and
  an inverter having an input coupled to an output of the delay circuit, and an output coupled to a second input of the first AND gate and to a second input of the first OR gate, wherein the logic circuit is configured to:
    when the output of the first AND gate is equal to the output of the first OR gate, cause the second PWM signal to be equal to the output of the first OR gate, and
    when the output of the first AND gate is different from the output of the first OR gate, cause the PWM signal to remain at a previous state.

17. A converter comprising:
  an input node configured to receive an input signal;
  an output node configured to deliver an output signal from the input signal, wherein the converter is configured to regulate the output signal to a target value;
  a switching power circuit stage having an output coupled to the output node;
  a driver node configured to provide to the switching power circuit stage a driving pulse-width modulated (PWM) signal;
  a first active time generator circuit configured to provide a first PWM signal having a first active time value;
  a second active time generator circuit configured to provide a second PWM signal having a second active time value; and
  a selector circuit configured to:
    receive the first and second PWM signals,
    in a first operational mode of the converter, provide the first PWM signal as the driving PWM signal to the switching power circuit stage, and
    in a second operational mode of the converter, provide the second PWM signal as the driving PWM signal to the switching power circuit stage, wherein the second active time generator circuit is configured to adaptively vary, in a step-wise manner, the second PWM signal to cause the second active time value to match the first active time value during a transition between the first and second operational modes.

18. The converter of claim 17, further comprising an inductor coupled between the output of the switching power circuit stage and the output node.

19. The converter of claim 18, wherein the converter is a buck converter.

20. The converter of claim 17, further comprising:
  a differential circuit having a first input coupled to the output node, a second input configured to receive a reference voltage, and an output coupled to the first active time generator circuit; and
  a comparator having a first input configured to receive the reference voltage, a second input coupled to the output node, and an output coupled to the second active time generator circuit.

* * * * *